Patented Aug. 2, 1927.

1,637,661

UNITED STATES PATENT OFFICE.

KARL FRIEDRICH SCHMIDT, OF HEIDELBERG, AND PHILIPP ZUTAVERN, OF LUDWIGS-HAFEN-ON-THE-RHINE, GERMANY, ASSIGNORS TO KNOLL & CO., OF LUDWIGS-HAFEN-ON-THE-RHINE, GERMANY, A FIRM COMPOSED OF ALBERT KNOLL, HANS KNOLL, AND MAX DAEGE.

PRODUCTION OF ORGANIC COMPOUNDS.

No Drawing. Application filed December 11, 1925, Serial No. 74,885, and in Germany April 11, 1925.

The present invention relates to the production of derivatives of hypothetical imines including the amines and their substitution products by the direct introduction of amino nitrogen into compounds treated. Methods for the direct introduction of amino nitrogen into hydrocarbons has not heretofore been known. The introduction of amino nitrogen is usually accomplished by the use of the nitrocompounds and in some cases by the use of phenols whereby the characteristic groups of the compounds are modified and/or exchanged.

The term, "amines" includes the primary amines, the secondary amines and the tertiary amines. (See "A Text Book of Organic Chemistry", Richter, translated by Smith, volume 1, pages 166 and 167, P. Blakiston's Son & Company, 1913). The present invention resides in the broad process of directly introducing either the $NH_2$ group, the NH group or amino nitrogen corresponding to that present in the tertiary amines or their derivatives into hydrocarbons carbonyl compounds and derivatives of these bodies. Under the expression "carbonyl compounds" we include such compounds as contain at least one keto- or aldehyde group.

The expression "trivalent basic nitrogen", as hereinafter used, is the generic expression for amino-nitrogen whether one, two or three of the valences of the nitrogen are satisfied by hydrogen atoms i. e. whether such nitrogen occurs in primary, secondary or tertiary amines and it is also intended to include the nitrogen in the nitriles (—C≡N). It is not necessary that the final product have basic properties.

The concentrated mineral acids are examples of one type of catalyst which will facilitate the direct introduction of the amino nitrogen into the hydrocarbon compounds or their derivatives. Other catalytic agents as hereinafter more specifically set forth have been found to give very satisfactory results. It is to be understood that the present invention is broadly directed to the use of any catalyst which will facilitate the direct introduction of amino nitrogen into the hydrocarbon compounds or its derivatives. Examples of other catalysts which may be used are as follows: phosphorus-pentoxid, zinc chloride, iron (ferric/ferrous) chloride, phosphorus pentachloride, phosphorus trichloride, phosphorus oxychloride, $SnCl_2$, $SnCl_4$, $K_2SnCl_6$, $(NH_4)_2SnCl_6$, $SbCl_3$, $AlCl_3$ and their equivalents. Any catalyst of the type of zinc chloride and of the other catalysts enumerated above may be used so long as they do not possess basic properties which destroy the hydrazoic acid by neutralization. Besides inorganic catalysts, it has also been discovered that organic catalysts, such as sulphoacetic acid $SO_3H-CH_2 \cdot COOH$ and ethyl sulphuric acid may be used. A gaseous substance as gaseous hydrochloric acid may also be used as a catalyzer in the place of sulphuric acid or the above catalyzers. When the above catalysts are used instead of sulphuric acid they are added to the reaction mixture until the evolution of gas ceases.

Using concentrated mineral acid or any of the above named catalysts either in molecular proportions or in excess, the processes are as a rule, carried out without danger and with good yields, when working with small quantities, that is, on the laboratory scale, provided sufficient precautions are observed. However, great difficulties are encountered in transferring the process from a laboratory scale to commercial operation. On operating with large quantities of the reacting materials, the reactions proceed with great violence and with very great evolution of heat and, in view of the explosiveness of the hydrazoic acid, series accidents may be caused and the yield may be greatly reduced.

By using a nonacid inorganic catalyst it is possible to conduct the reactions so that the latter proceed quietly and uniformly and in addition, the yields, in many cases are greater than when the process is carried out by the use of concentrated mineral acid. The quantity of the catalyst to be used will be determined by the process itself, as the addition of the contact substance must be continued until the calculated amount of nitrogen is evolved.

As specific examples of the manner of practicing the above processes, the following are given:

Example 1.

200 parts benzol solution of hydrazoic acid containing 30 parts $N_3H$ were gradually mixed with anhydrous $AlCl_3$ while cooled until the evolution of gas ceased. With the addition of ice it was made alkaline with caustic soda solution and the resulting aniline was carried over by steam.

Example 2.

3 mol. dimethyl acetoacetic ester, dissolved in 1300 cc. benzol solution of hydrazoic acid containing 4 mol. $N_3H$ were dropped while cooled on 1 kg. of anhydrous iron chloride. After the end of the evolution of gas (65 liters $N_2$) it was made alkaline with caustic soda solution, extracted with benzol and the benzol distilled off. Residue, acetylamido-isobutyric acid ester.

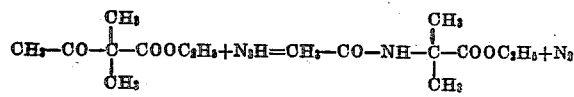

Example 3.

260 parts benzaldehyde dissolved in 1000 parts benzol nitride with a content of 110 parts $N_3H$ were treated with dried hydrochloric acid gas while constantly agitated until no gas evolution followed. After distilling off the benzol benzonitrile remained behind.

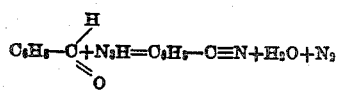

Example 4.

170 parts cyclohexanone carboxylic acid ester dissolved in 1000 parts benzol solution of hydrazoic acid containing 60 parts $N_3H$ were treated with dried hydrochloric acid gas during agitation and constant cooling until the evolution of nitrogen ceased. The resulting mixture was agitated with water, the water layer drawn off from the benzol, heated for 3 hours to boiling under a reflux and then boiled down in vacuum to crystallization. The hydrochloric acid salt of the amidopimelic acid crystallized out.

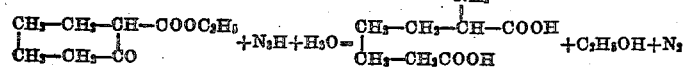

Example 5.

49 g. of cyclohexanon are dissolved in 200 cc. of benzol, either or tetralin containing 21.5 g. hydrazoic acid and while well cooling 50 g. of thionyl chlorid are added drop by drop.

The yield of leucinlactam is about 40 g.

The reaction probably takes place as follows:

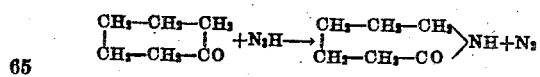

In the claims, the expression "organic compounds of the hydrocarbon type" is intended as a generic expression to include hydrocarbons and their derivatives.

By the expression "compound of the hydrocarbon type" intend to include not only hydrocarbons but also certain derivatives of hydrocarbons. Some of the compounds included in this term would be cyclohexanone, acetone, benzophenone, benzol or other aromatic hydrocarbons, acetoacetic ester, benzaldehyde, cyclohexanone carboxylic acid, cyclopentanone and other similar or analogous compounds. All these compounds will react with catalysts other than mineral acids to give valuable nitrogen content compounds. Those compounds above which contain keto or aldehyde groups are specifically covered in the claims by the expression "carbonyl compounds."

We claim:—

1. The process of treating organic compounds of the hydrocarbon type to directly introduce therein trivalent basic nitrogen comprising adding thereto hydrazoic acid in the presence of a catalyst.

2. The process of treating organic compounds of the hydrocarbon type to directly introduce therein trivalent basic nitrogen comprising adding thereto hydrazoic acid in the presence of an inorganic catalyst.

3. The process of treating organic compounds of the hydrocarbon type to directly introduce therein trivalent basic nitrogen comprising adding thereto hydrazoic acid in the presence of inorganic catalysts which are not mineral acids but are salts and other compounds.

4. The process of treating organic compounds of the hydrocarbon type to directly introduce therein trivalent basic nitrogen comprising adding thereto hydrazoic acid in the presence of a catalyst consisting of an inorganic chlorid.

5. The process of treating organic compounds of the hydrocarbon type to directly introduce therein trivalent amino nitrogen comprising adding thereto hydrazoic acid in the presence of a catalyst comprising one of the following group: zinc chloride, iron chloride, phosphorus pentachloride, phosphorus trichloride, phosphorus oxychloride, phosphorus pentoxid, tin dichloride, tin tetrachloride, potassium chlostannate, ammonium chlorstannate, antimony trichloride, aluminum chloride, hyrochloric acid and their equivalents.

6. The process of making derivatives of hydrazoic amines including the imines and their substitution products comprising treating organic compounds of the hydrocarbon type with inorganic catalysts which are not mineral acids but are salts and other compounds in the presence of hydrazoic acid.

7. The process of treating carbonyl compounds to directly introduce therein trivalent amino nitrogen comprising adding thereto hydrazoic acid in the presence of a catalyst.

8. The process of treating carbonyl compounds to directly introduce therein trivalent amino nitrogen comprising adding thereto hydrazoic acid in the presence of an inorganic catalyst.

9. The process of treating carbonyl compounds to directly introduce therein trivalent amino nitrogen comprising adding thereto hydrazoic acid in the presence of inorganic catalysts which are not mineral acids but are salts and other compounds.

10. The process of treating carbonyl compounds to directly introduce therein trivalent amino nitrogen comprising adding thereto hydrazoic acid in the presence of a catalyst consisting of an inorganic chlorid.

11. The process of treating carbonyl compounds to directly introduce therein trivalent amino nitrogen comprising adding thereto hydrazoic acid in the presence of a catalyst comprising one of the following group: zinc chloride, iron chloride, phosphorus pentachloride, phosphorus trichloride, phosphorus oxychloride, phosphorus pentoxid, tin dichloride, tin tetrachloride, potassium chlorstannate, ammonium chlorstannate, antimony trichloride, hydrochloric acid and their equivalents.

12. The process of treating organic compounds of the hydrocarbon type to directly introduce therein trivalent amino nitrogen comprising adding thereto hydrazoic acid in the presence of a catalyst which will not neutralize the acid.

13. The process of treating carbonyl compounds to directly introduce therein trivalent amino nitrogen comprising adding thereto hydrazoic acid in the presence of a catalyst which will not neutralize the acid.

In testimony that we claim the foregoing as our invention, we have signed our names hereto.

KARL FRIEDRICH SCHMIDT.
PHILIPP ZUTAVERN.